Patented June 3, 1952

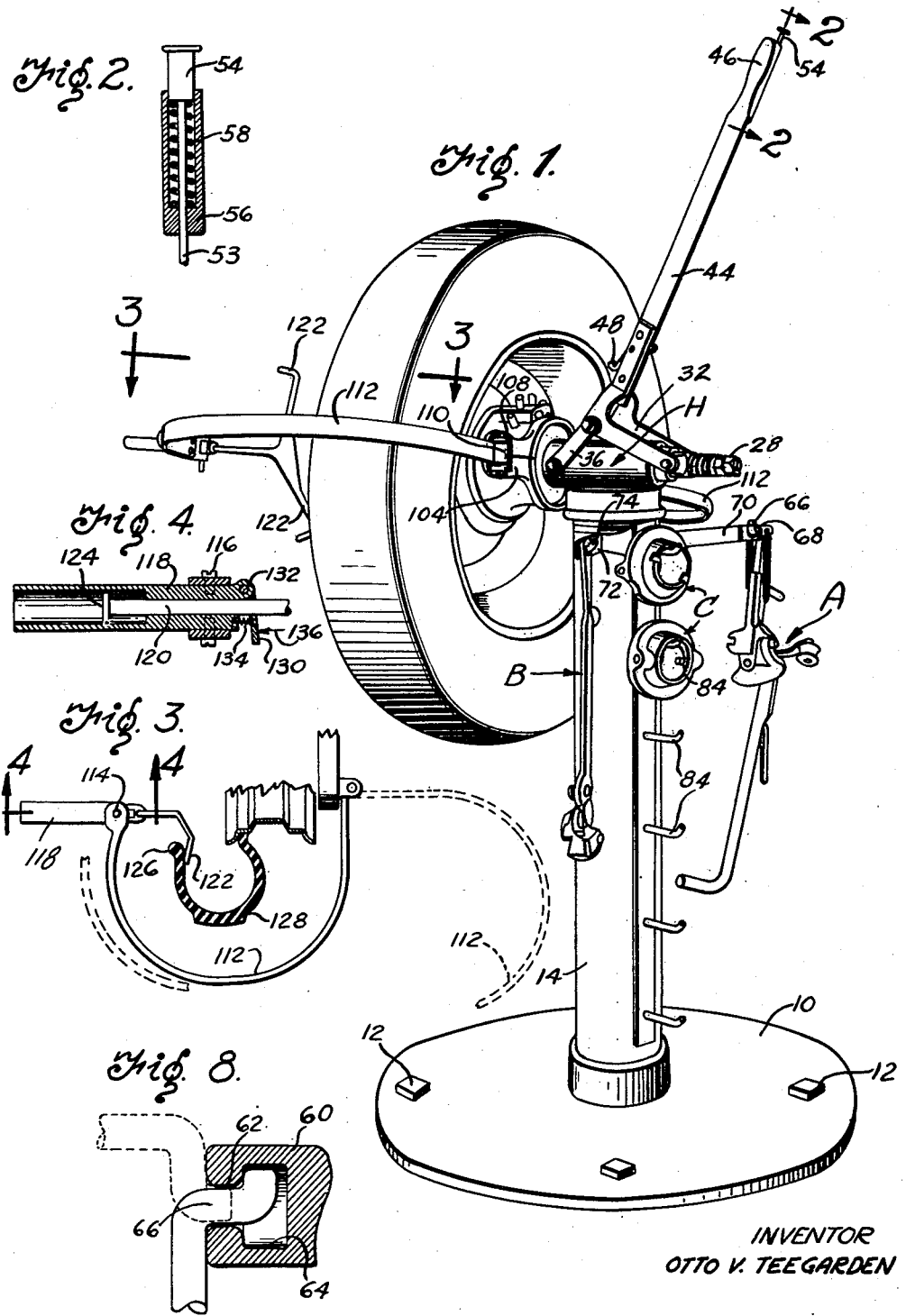

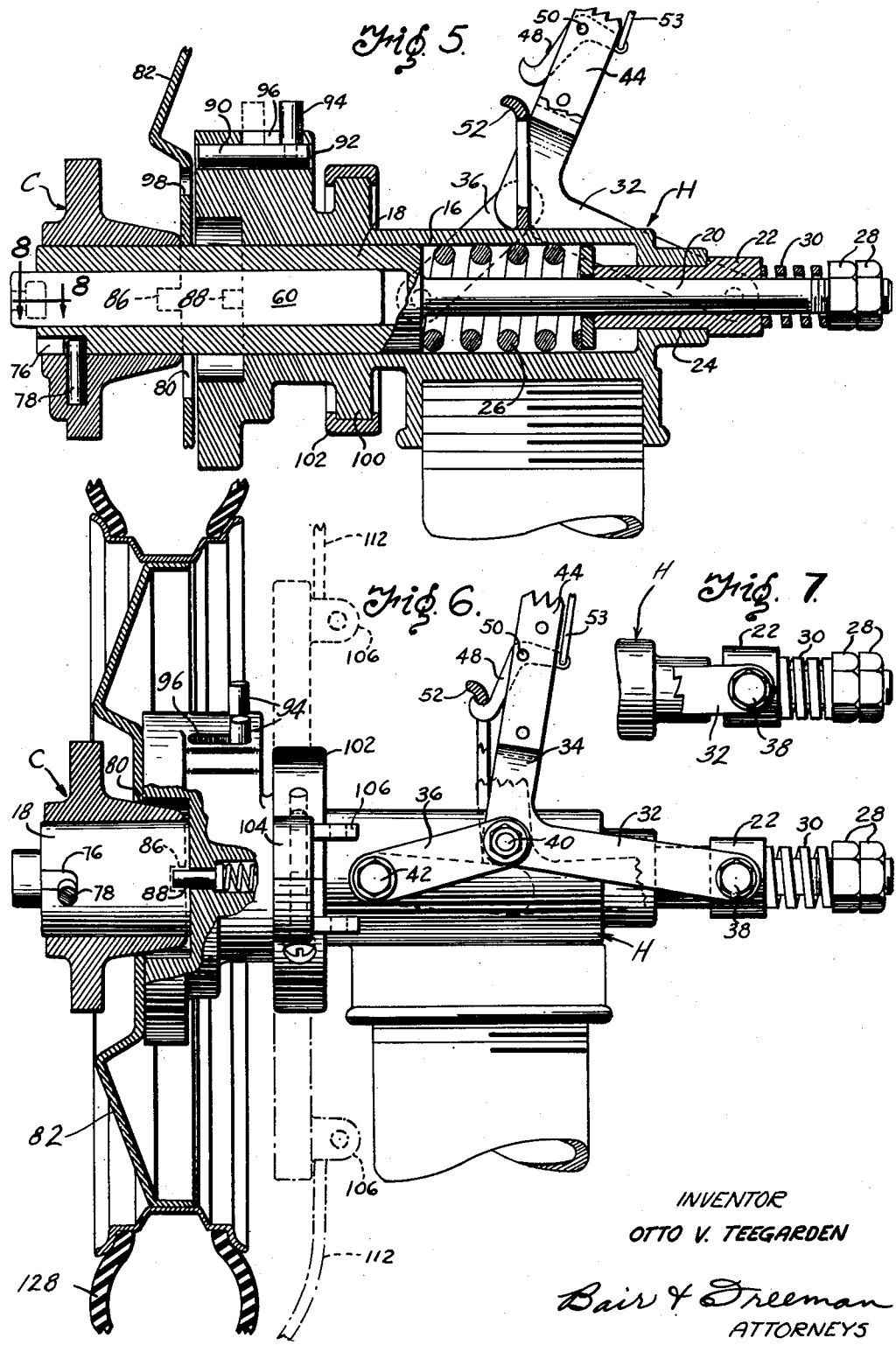

2,598,946

UNITED STATES PATENT OFFICE 2,598,946

TIRE HANDLING STAND WITH MOVABLE CLAMPING ARBOR

Otto V. Teegarden, Goshen, Ind.

Application November 29, 1946, Serial No. 713,167

8 Claims. (Cl. 144—288)

My present invention relates to a tire handling stand of the general character shown in my copending application Serial No. 492,684 filed June 29, 1943, the present application being a continuation-in-part thereof. Said copending application is now Patent No. 2,413,010 issued December 24, 1946.

One object of the present invention is to provide a tire handling stand on which a wheel and tire may be rigidly supported for the purpose of easily removing the tire from the wheel and replacing it thereon with a minimum of time and effort.

Another object is to provide a supporting stand which will support the wheel and tire rigidly in a non-movable position so that tire removing and replacing tools can be used on the tire without slippage or other accidents occurring as when an attempt is made to change a tire lying on the ground or manually held in some other position.

Still another object is to provide a support for a wheel which includes a removable cone element to hold the wheel on an arbor and a pin to coact with one of the bolt holes of the wheel to prevent it from rotating while removing and replacing the tire on the wheel, the arbor being slidable and the cone element being removable for permitting the wheel to be placed on the arbor. The arbor is also movable in relation to the stand for drawing the cone element toward the stand and thereby the wheel into engagement with the stand and clamped against rotation.

A further object is to provide casing spreader elements supported on the tire handling stand and readily movable to and from an inoperative position out of the way and also to and from an operative position where the casing can be spread considerably to facilitate inspection and repair while the casing remains partially on the rim of the wheel.

Still a further object is to provide a tire handling stand particularly adapted for use in connection with the present-day drop-center rim and for use with the tire removing tool of my Patent No. 2,378,955 issued June 26, 1945 and the tire replacing tool of my Patent No. 2,421,856 issued June 10, 1947, which are designed to handle all operations in connection with the removal and replacement of the tire relative to the rim of the wheel.

With these and other objects in view, my invention consists in the construction, arrangement and combination of the various parts of my device whereby the objects contemplated are attained as hereinafter more fully set forth, pointed out in my claims and illustrated in the accompanying drawings, wherein:

Figure 1 is a perspective view of a tire handling stand embodying my present invention.

Figure 2 is an enlarged sectional view on the line 2—2 of Figure 1 showing the details of a latch release-button.

Figure 3 is a sectional view on the line 3—3 of Figure 1 showing a casing spreader in use.

Figure 4 is an enlarged detail sectional view on the line 4—4 of Figure 3.

Figure 5 is an enlarged vertical sectional view through the head of the tire handling stand showing a wheel being associated therewith.

Figure 6 is a similar view showing the wheel clamped to the head.

Figure 7 is a view similar to the right-hand end of Figure 6 illustrating the parts in a different position, and Figure 8 is an enlarged sectional view on line 8—8 of Figure 5.

On the accompanying drawings I have used the reference numeral 10 to indicate a base which is provided with several openings to receive lag screws or bolts 12 for securing the base to a floor surface. A tubular post 14 extends upwardly from the base 10 and a head H is mounted thereon so that the entire assembly of base 10, post 14 and head H constitute a rigid stand.

The head H has bore 16 (see Figure 5) which receives a tubular arbor 18. The arbor is slidably mounted in the head. The arbor 18 has a rod-like extension 20 passing through the sleeve 22 which is slidable in a second bore 24 of the head H. A spring 26 is interposed between the arbor 18 and the sleeve 22 and the rod 20 is provided with locknuts 28 between which and the sleeve 22 a second spring 30 is interposed.

The sleeve 22 is adapted to be slid in relation to the head H by means of a bifurcated bell crank having a pair of arms 32 and a pair of arms 34, the bell crank being connected by a pair of links 36 to the head H. The connections of the parts just described with each other are in the form of cap screws 38, bolts 40 and cap screws 42. The cap screws 38 pivot the arms 32 to the sleeve 22. The bolts 40 pivot the bell cranks 32—34 to the links 36. The cap screws 42 pivot the links 36 to the head H.

The arms 34 of the bell crank are connected to a lever 44 terminating in a handle 46. A latch 48 is provided for the lever 44, the latch being pivoted to the lever at 50. The latch is adapted to coact wtih an eye member 52 extending upwardly from the head H.

The latch 48 is connected by means of a rod 53 with a push-button 54 (see Figure 2). The push-button is slidable in a boss 56 on the handle 46 and a spring 58 is enclosed in the boss for normally raising the push-button 54 and unlatching the latch 48 from the eye member 52.

Within the bore of the tubular arbor 18 I provide a freely slidable extension 60 having an opening 62 in its outer end (left end in Figures 5 and 8). Inward of the opening 62 there is an enlarged socket 64 to receive a Z-shaped end 66 of a tire replacing tool indicated generally at A in Figure 1 and constituting the subject matter of my Patent No. 2,421,856. This tool when not in use, has its Z-shaped end 66 entered through a perforation 68 of an arm-like bracket 70 from which it can be readily removed when it is desired to use it. The arm 70 extends from the post 14 and a second arm 72 extends therefrom and is provided with a hook 74 on which a tire removing tool B of my Patent No. 2,378,955 may be hung when not in use. The arms 70 and 72 are in such position that the tools can readily be reached from a position in front of the wheel when it is desirable to use them.

The tubular arbor 18 is provided adjacent its outer end with a pair of opposite bayonet slots 76. This end is adapted to have cone elements C associated therewith, the cone elements having bayonet pins 78 for coating with the bayonet slots 76. The cone elements C are made in various sizes to fit different sizes of disc openings 80 in the disc wheels 82 which constitute the majority of present-day wheels.

Two of the cone elements are illustrated in Figure 1 and when not in use may be supported on hooks 84 where they are conveniently accessible when needed. Each cone element C has opposite notches 86 adapted to coact with spring pressed pins 88 (see Figure 6), during certain operations of the tire handling stand as will herein further be described.

The head H slidably supports a series of pins 90 located in holes 92 drilled in the head. These pins can be slid to the full line or dotted line positions of Figure 5 by means of lateral pins 94 extending through slots 96 of the head H. These pins are at different distances from the axis of the head so as to coact with wheel bolt holes 98 which are at different distances from the center on different makes of wheels. I have found that four spacings are sufficient to take care of the majority of standard wheels.

The head H has a disc-like flange 100 (see Figure 5) surrounding which is a split band 102. The band 102 has opposite extensions 104 each terminating in a pair of perforated ears 106 to receive the pivot bolt 108 and eye 110 of a tire spreader strap 112 which is pivoted on each bolt 108. These straps are C-shaped as shown in Figure 3 and at their outer ends are bifurcated to provide a pair of perforated ears 114.

Pivoted at 116 on the ears 114 is a tubular handle 118 in which a rod 120 is slidably mounted. The rod has a pair of casing engaging hooks 122 on one side and a head 124 on the other end. The hooks 122 are adapted to coact with the bead 126 of a tire casing 128 as shown in Figure 3 for the purpose of spreading the casing for convenience in removing and replacing the inner tube and for inspecting the casing when the tube is removed.

A clutch for the rod 120 in relation to the handle 118 is provided in the form of a perforated plate 130 pivoted at 132 and biased by a spring 134 to the binding position shown in Figure 4. By pressing against the plate 130 as indicated by the arrow 136, the clutch is released so that the rod 120 can be pulled outwardly. Due to the angle of the plate 130 the rod can be pushed inwardly at any time and will be held thereafter against outward movement.

*Practical operation*

In the operation of my tire handling stand, after the wheel is removed from the automobile and the bead of the casing loosened from the rim if necessary by a rubber hammer or other suitable means, the wheel is mounted on the stand in the following described manner:

With all cone elements C removed from the arbor 18 and the lever 44 in the released position of Figures 1 and 5, the wheel is placed on the arbor 18 with the central opening 80 of the wheel disc surrounding the arbor. The proper size of cone element C is then placed on the arbor with its bayonet pins 78 received in the bayonet slots 76, the cone element C being rotated clockwise so that the pins are in the offset inner ends of the bayonet slots to prevent the cone from thereafter being pulled off the arbor 18 or the arbor being pulled out of the cone element.

The next operation is to pull the cone element into the opening 80 of the wheel which is done by sliding the arbor 18 from the position of Figure 5 toward the right by swinging the lever 44 forwardly until the latch 48 can be engaged under the cross piece of the eye 52 as shown in Figure 6. The cone element, it will be noted, is pulled into the opening 80 and centers the wheel on the cone. At this time the pin 88 is received in the notch 86 of the cone element to positively prevent reverse rotation of the cone that would permit the pins 78 to come out of the slot 76 and the spring 30 is under slight compression which permits rotation of the wheel 82 on the cone element and at the same time takes care of any slight differences in the position of the cone element caused by variations on different wheels. Larger or smaller cone elements are of course used for different size disc openings 80 but even on the wheels made by one manufacturer there may be slight differences and the cone surface in conjunction with the spring 30 take care of this.

Another reason for permitting rotation of the wheel 82 is so that one of the holes 98 may register with one of the pins 90. The pins can be seen through the holes 98 of the wheel as it is rotated and when that pin which is the proper distance from the center of rotation registers with the opening, the pin can be pushed from the solid line position to the dotted position of Figure 5, thereafter preventing further rotation of the wheel. Such rotation of the wheel is performed manually against the slight friction of the wheel against the left end of the head H under the bias of the spring 30.

After the wheel has been located, preferably with the tire valve at the lower left position for convenience of removing the inner tube, it is desirable to rigidly lock the wheel against any further rotation, so that the tire removing and replacing tools can be operated by rotating them relative to the wheel. Locking is accomplished by pulling the handle 46 forwardly so that the bell crank arms 32 and the links 36 swing from the full line position to the dotted position of Figure 6 which further compresses the spring 30 as shown in Figure 7 and thereby increases the friction of the wheel against the head with the spring 30 still taking care of slight irregularities in manufacture of the wheel and/or cone elements.

With the wheel thus rigidly held the tire replacing tool A is connected to the extension 60 by engaging the Z hook 66 therein as shown by dotted lines in Figure 8 after which the tool is swung down to the full line position and can thereafter rotate around the extension 60 as a center. The removing tool B is associated with the replacing tool as shown in my prior patents, the replacing tool serving as a handle for the removing tool and with about one rotation of the removing tool the tire bead of the tire comes off the rim of the wheel 82 as shown in Figure 3.

The C-shaped straps 112 may then be swung around from an out-of-the-way position back of the wheel as shown by dotted lines in Figure 3 to an operative position as shown by dash lines. The straps 112 may then be sprung inwardly to the full line position and the hooks 122 engaged with the tire bead 126 whereupon release of the straps will cause them to open somewhat and spread the casing to the full line position for ready removal and replacement of the inner tube and for the purpose of aiding in inspecting the interior of the casing while the inner tube is out. The clutch connection 130 for the rod 120 permits adjustment of the hooks 122 for different sizes of casings. The hooks, it will be noted, are made Y-shaped or with double ends so as to engage the casing at spaced points and spread the casing substantially evenly throughout its diameter.

The C-shaped straps 112 are mounted on the head H for rotation by means of the elements 102 surrounding the flange 100. For the purpose of inspecting the casing, the lever 44 may be returned to the full line position of Figure 6, the pin 90 retracted and the wheel rotated for conveniently seeing all portions of its inner surface. The arrangement just described permits rotation of the C-shaped straps 112 with the tire casing during this operation. In Figure 6 I show by dot-and-dash lines the position of the straps when rotated to the vertical instead of the usual horizontal position shown in Figure 1.

After the inner tube has been repaired and the tire casing inspected, the wheel may be locked against rotation by means of the pin 90 and adjustment of the lever 44 to the dotted position of Figure 6. The inner tube may then be replaced and the tire replacing tool A used for replacing the casing on the rim of the wheel 82.

During both the replacing and removing operation it is desirable that the replacing tool A be substantially parallel to the plane of the wheel and to accomplish this the Z-shaped hook 66 may have to be adjusted inwardly or outwardly. By having the tool supporting extension 60 freely slidable, such adjustment can easily be made by hand, the most desirable position being one in which the tire removing tool is substantially parallel to the plane in which the wheel rotates. This adjustment is readily accomplished by swinging the outer handle end of the tool after the tool is hooked on the rim of the wheel.

After the tire is back on the wheel, the wheel is released by moving the lever 44 to the position of Figure 1 which moves the cone element C to released position where it can be manually backed off relative to the bayonet slots 76. The cone element may then be returned to its hook 84 and the wheel removed and replaced on the automobile.

During the cone element moving operations and the wheel locking and releasing operations the springs 26 and 30 oppose each other under some tension to serve as a means to resiliently connect the sleeve 22 to the arbor 18 as in Figure 5. This connection permits the arbor to be withdrawn to the position of Figure 6 whereupon the righthand end of the spring 26 is stopped by the hub surrounding the bore 24 and thereafter the spring 30 is compressed more or less depending upon the position of the lever 44 as shown and described in connection with Figures 6 and 7.

I have found a tire handling stand of the character disclosed very convenient for use in connection with tire removing and replacing tools such as those illustrated at A and B. The stand holds the wheel rigidly when desired and at other times permits rotation for the purpose of aligning the opening 98 with one of the pins 90, or for inspecting the inner surface of the tire casing while it is held spread by the straps 112 and the hooks 122. All of these features contribute to the performance of tire removing and replacing operations in a minimum of time and cut down substantially on labor. The tire stand is therefore a valuable accessory to a garage or service station.

Some changes may be made in the construction and arrangement of the parts of my tire handling stand, without departing from the real spirit and purpose of my invention, and it is my intention to cover by my claims any modified forms of structure or use of mechanical equivalents which may be reasonably included within their scope without sacrificing any of the advantages thereof.

I claim as my invention:

1. In the tire handling stand, a rigid post, an arbor extending therefrom for supporting a wheel at its center hole, a cone element to enter said center hole, said cone element having a bayonet pin and slot connection with said arbor, means including a spring connection for moving said arbor toward said post for frictionally engaging said wheel with said post, and means to selectively lock said cone element against rotation or permit it to rotate.

2. In a tire handling stand, a rigid support, an arbor extending therefrom for supporting a wheel at its center hole, a cone element to enter said center hole, said cone element having a bayonet pin and slot connection with said arbor, and means for moving said arbor toward said support for frictionally engaging the wheel with the support, said last means including a pair of spaced shoulders on said arbor, a sleeve slidable on said arbor between said shoulders, springs between said shoulders and said sleeve, and means for moving said sleeve for tensioning the wheel against said support.

3. A tire handling stand comprising a rigid support, an arbor extending therefrom, slidable relative thereto and adapted to enter the center hole of a wheel having a tire thereon, a flange element detachably connected with said arbor for engaging the wheel and causing the wheel to engage said support, means for sliding said arbor to effect such engagement, said means comprising toggle linkage having a resilient connection with the arbor, and means for preventing rotation of said wheel relative to said support comprising a plurality of selectively slidable pins at different distances from the center of rotation and coactable with a bolt opening of the wheel.

4. A tire handling stand comprising a rigid support, an arbor extending therefrom, slidable relative thereto and adapted to enter the center hole of a wheel having a tire thereon, a flange element detachably connected with said arbor for engaging said wheel and causing the wheel to engage said support, and means for sliding said arbor to effect such engagement, said means comprising a sleeve slidable thereon within said support, a spring on the arbor at each end of said sleeve and interposed between the sleeve and a pair of spaced shoulders on said arbor, and toggle linkage for sliding said sleeve and through it and said springs sliding said arbor.

5. In a tire handling stand, a base, a post extending upwardly therefrom, a head on said post, an arbor slidably carried by said head, a wheel engaging flange detachably connected with said arbor, said arbor and flange being adapted for mounting a wheel with the center opening of the wheel surrounding the arbor and the flange engaging the wheel with said head, means for sliding said arbor toward said head including a toggle lever and a cushioning spring, the arbor in one position with the cushioning spring compressed causing sufficient frictional engagement to prevent free rotation of the wheel relative to the head but permit manual rotation thereof, a latch for said toggle lever when said arbor is in said one position, said head having a projection adaptable for entering a bolt hole of the wheel for preventing such rotation, said toggle lever when moving to a position slightly over center, increasing the spring pressure and thereby the friction of the wheel against said head.

6. A tire handling stand comprising a rigid post, a head thereon, an arbor slidably carried by said head, a wheel engaging element detachably connected with the outer end of said arbor, said arbor and element being adapted for mounting a wheel with the center opening of the wheel surrounding the arbor, means for sliding said arbor toward said head including a cushioning spring, the arbor in one position with the cushioning spring compressed causing sufficient friction to prevent free rotation of the wheel relative to said head but permit manual rotation thereof, and a plurality of selectively operable pins at different distances from the center of rotation for providing coaction between said head and the wheel to positively prevent rotation of the wheel relative to said head.

7. A tire handling stand comprising a rigid post, a head thereon, an arbor slidably carried by said head, a wheel engaging element detachably connected with the outer end of said arbor, said arbor and element being adapted for mounting a wheel with the center opening of the wheel surrounding the arbor, a toggle lever for sliding said arbor toward said head, a cushioning spring between said toggle lever and said arbor, the toggle lever in one position with the cushioning spring partially compressed causing sufficient friction to prevent free rotation of the wheel relative to said head but permit manual rotation thereof, latch means for said toggle lever in said one position, means of coaction between said head and the wheel to positively prevent rotation of the wheel in relation to said head, said toggle lever in a final position beyond said latch means increasing the spring pressure of said cushioning means.

8. In a tire handling stand, a support including an arbor to be received in the center hole of a wheel having a tire thereon, an extension freely slidable in said arbor and projecting from one end thereof, said extension having an axial recess in its outer end provided with a restricted entrance for a hooked and rotatable engagement with a tire handling tool, said extension, being freely slidable in said arbor, permitting said tool to seek its own adjustment to a plane of rotation substantially parallel with the plane of rotation of the wheel.

OTTO V. TEEGARDEN.

REFERENCES CITED

The following references are of record in the file of this patent:

UNITED STATES PATENTS

| Number | Name | Date |
|---|---|---|
| 1,244,245 | Robertson | Oct. 23, 1917 |
| 1,341,727 | Weaver | June 1, 1920 |
| 1,505,141 | Hawkinson | Aug. 19, 1924 |
| 1,809,169 | Kennedy | June 9, 1931 |
| 1,959,655 | Brouhard | May 22, 1934 |
| 2,000,036 | Renfro | May 7, 1935 |
| 2,057,200 | McCarthy | Oct. 13, 1936 |
| 2,065,644 | Bristol | Dec. 29, 1936 |
| 2,081,402 | Krema | May 25, 1937 |
| 2,178,101 | Hatch | Oct. 31, 1939 |
| 2,201,982 | Bazarek | May 28, 1940 |
| 2,296,162 | Hanson et al. | Sept. 15, 1942 |
| 2,349,552 | Holmes | May 23, 1944 |